United States Patent
Wu

(10) Patent No.: US 11,378,820 B2
(45) Date of Patent: Jul. 5, 2022

(54) ASPHERIC LENS USING E-VALUE TO CONTROL EYE BALL GROWTH RATE AND METHOD OF MANUFACTURING THE SAME

(71) Applicant: BRIGHTEN OPTIX CORP., Taipei (TW)

(72) Inventor: I-Tsung Wu, Taipei (TW)

(73) Assignee: BRIGHTEN OPTIX CORP., Taipei (TW)

( * ) Notice: Subject to any disclaimer, the term of this patent is extended or adjusted under 35 U.S.C. 154(b) by 160 days.

(21) Appl. No.: 16/707,519

(22) Filed: Dec. 9, 2019

(65) Prior Publication Data

US 2020/0110285 A1  Apr. 9, 2020

Related U.S. Application Data

(63) Continuation of application No. 16/158,833, filed on Oct. 12, 2018, now abandoned.

(30) Foreign Application Priority Data

Nov. 17, 2017  (TW) .................................. 106217150

(51) Int. Cl.
G02C 7/04 (2006.01)
G02C 7/06 (2006.01)

(52) U.S. Cl.
CPC ............. *G02C 7/047* (2013.01); *G02C 7/041* (2013.01); *G02C 7/061* (2013.01); *G02C 2202/12* (2013.01); *G02C 2202/24* (2013.01)

(58) Field of Classification Search
CPC ............................ G02C 7/047; G02C 2202/24
USPC ...................................... 351/159.02
See application file for complete search history.

(56) References Cited

U.S. PATENT DOCUMENTS

| | | | |
|---|---|---|---|
| 8,201,941 B2 * | 6/2012 | Choo | G02C 7/047 351/159.73 |
| 10,001,660 B1 * | 6/2018 | Chow | G02C 7/047 |
| 2008/0212021 A1 * | 9/2008 | Berke | G02C 7/047 351/159.02 |
| 2016/0239634 A1 * | 8/2016 | Yen | A61B 3/16 |

* cited by examiner

*Primary Examiner* — Kristina M Deherrera
(74) *Attorney, Agent, or Firm* — Muncy, Geissler, Olds & Lowe, P.C.

(57) ABSTRACT

An aspheric lens using an E-value to control an eyeball growth rate and a method of manufacturing the same are disclosed. A treatment zone of the aspheric lens includes a base curve having non-zero eccentricity, and the base curve can make the image shell formed on a retina have non-zero eccentricity, so as to increase a peripheral defocus area formed on the retina to effectively control myopia or hyperopia, thereby achieving the purpose of correcting myopia or hyperopia.

1 Claim, 3 Drawing Sheets

ASPHERIC LENS USING E-VALUE TO CONTROL EYE BALL GROWTH RATE AND METHOD OF MANUFACTURING THE SAME

This application is a Continuation-In-Part of co-pending application Ser. No. 16/158,833, filed on Oct. 12, 2018, for which priority is claimed under 35 U.S.C. § 120, the entire contents of which are hereby incorporated by reference.

This application claims the priority benefit of Application No. 106217150 filed in Taiwan on Nov. 17, 2017.

BACKGROUND OF THE INVENTION

1. Field of the Invention

The present invention relates to an aspheric lens using E-value to control eyeball growth rate and method of manufacturing the same, and more particularly to an aspheric lens having a treatment zone in which a base curve has non-zero eccentricity to form a non-zero eccentricity of the image shell on the retina, so as to increase a peripheral defocus area imaged on the retina, thereby effectively controlling myopia or hyperopic.

2. Description of the Related Art

In recent years, with the development and innovation of various electronic products and electrical products, these products bring a lot of convenience to people in daily life and work. In particular, more and more electronic products cause widespread use in communications and Internet applications, so many people (such as office workers, students, middle-aged people, and elderly people) spend a lot of time and in the use of electronic products, and such people are usually called as phubbers. However, long-term use of electronic products causes many people's eyes vision loss or damage many people's eyes, and when this conditions are becoming more serious, myopia population is also rapidly increased.

Furthermore, the reason why people have myopia is a mismatch between the focusing power of the eye and the length of the eye, for example, when the axial length is too long or the curvature of the cornea is too steep, it causes a visual imaging to fall in front of the retina, so the visual image become blurry. Therefore, in order to correct myopia, it is necessary to reduce the power of an eye; about 80% of the refraction occurs in the cornea, so reduction of refractive power of the cornea can correct myopia.

There are many methods to correct refractive error mainly include glasses, contact lens, refractive corneal surgery, or orthokeratology lens. There are advantages and disadvantages to above different methods, and the orthokeratology lens will be especially described in following paragraphs. The orthokeratology lens is made of hard material with high oxygen permeability. When the orthokeratology lens is worn on an eyeball, a non-uniform distribution of tear film is sandwiched between the orthokeratology lens and an outer surface of cornea of the eyeball, and the tear can apply a positive hydraulic pressure on the cornea to compress epithelial cells; at the same time, when the wearer wear orthokeratology lens with eyes closed, the cornea is applied a gentle pressure through the tear file underneath eyelid and the orthokeratology lens. Therefore, after the wearer wears the lens for a sufficient time, central curvature of the wearer's cornea can be progressively flattened and central epithelial layer of the wearer's cornea can be gradually thinned, so that the central portion of the cornea can be flattened and refractive power of the cornea can be reduced, thereby treating the wearer to correct myopia or even return to normal vision.

However, the orthokeratology lens can correct myopia, but some people can't rely on conventional orthokeratology lens to effectively control the myopia progression, and the degree of myopia may continue to increase. Further, in a case of low myopes, such as myopia ranges from −0.50 D to −4.00 D, a base curve(s) and the reverse curve(s) of the spherical orthokeratology lens forms an insufficient (less than optimal) tear reservoir, and the epithelial cells are not effectively compressed and re-shaped by the conventional orthokeratology lens, and it results in weak myopia control effect.

Therefore, how to develop an aspheric lens to solve the aforementioned conventional problems is a key issue in the industry.

SUMMARY OF THE INVENTION

Therefore, the inventors develop an aspheric lens using E-value to control an eyeball growth rate and a method of manufacturing the aspheric lens, according to collected data, multiple tests and modifications, and years of experience in the industry.

An objective of the present invention is that a treatment zone of an aspheric lens includes a base curve and a reverse curve having non-zero eccentricity, and the base curve and reverse curve can make an image shell imaged on the retina have non-zero eccentricity, so as to increase a peripheral defocus area formed on the retina and effectively control myopia or hyperopia, thereby achieving the objective of correcting myopia or hyperopia.

An objective of the present invention is that a surface of the aspheric lens is manufactured in a form of aspheric shape, so that in case of low myopes the aspheric lens can have larger peripheral defocus area and higher amount of defocus amount compared with the conventional spherical orthokeratology lens, so as to achieve better myopia or hyperopia control effect.

An objective of the present invention is that in a process of manufacturing the aspheric lens, a shape of a user's cornea is inspected first, an eccentricity of a base curve and reverse curve of a preset orthokeratology lens are adjusted to form the base curve and reverse curve into an aspheric shape, so as to make a tear volume between the preset orthokeratology lens and the cornea match a tear volume required for the shape of the cornea to generate the require peripheral defocus effect; the manufacturing method of the present invention can effectively make the tear volume between the orthokeratology lens and the cornea indeed match the required tear volume, thereby reducing the manufacturing deviation and improving product yield.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
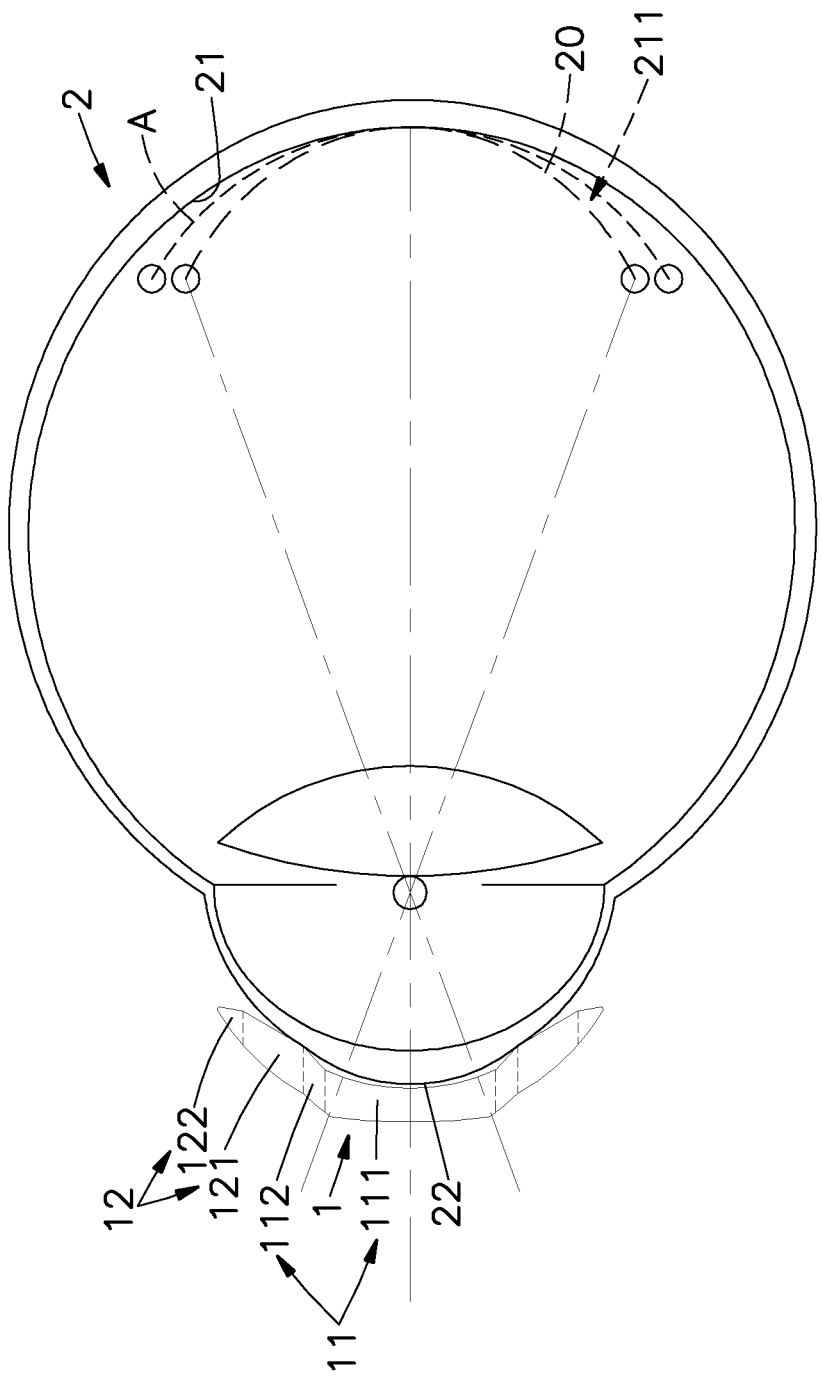
FIG. 1 is a schematic view of optical paths of an aspheric lens of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise", "include" and "have", and variations such as "comprises", "comprising", "includes", "including", "has" and "having" will be acknowledged to imply the inclusion of stated elements but not the exclusion of any other elements.

Figure 2:
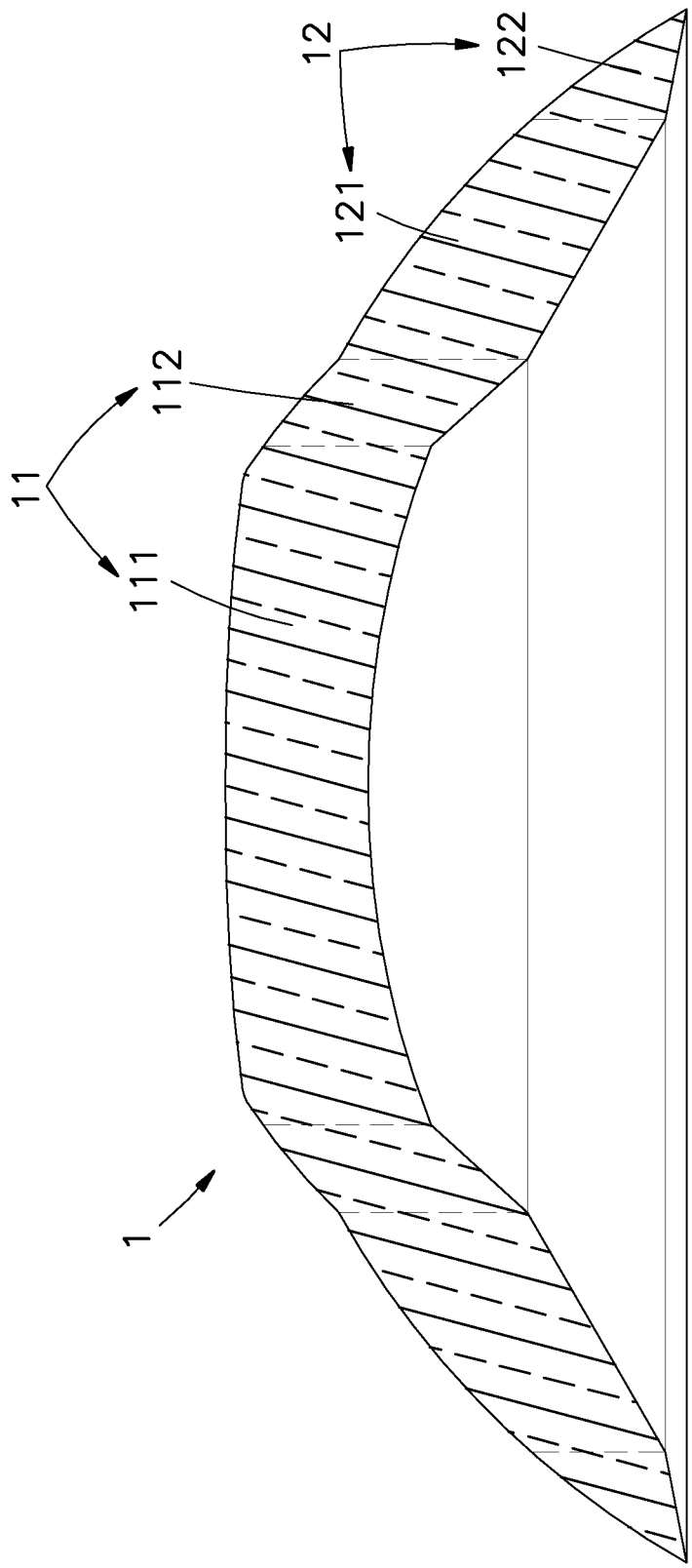
FIG. 2 is a sectional side view of an aspheric lens of the present invention.

Please refer to FIGS. 1 and 2, which are a schematic view of optical paths and a sectional side view of an aspheric lens of the present invention. As shown in FIGS. 1 and 2, the lens 1 is an orthokeratology lens, and has a surface in an aspheric shape, and the lens 1 comprises a treatment zone 11 for passing light to form image on a retina 21 of an eyeball 2, and an alignment zone 12 disposed on a non-visual area outside the treatment zone 11.

The treatment zone 11 includes a base curve (BC) 111 having a non-zero eccentricity, and a reverse curve (RC) 112 formed on an outer side of the base curve 111. The eccentricity is also called as an E-value. The reverse curve 112 can be in cooperation with the base curve 111 and the eyeball 2 to form a gap therebetween for tear reservoir.

The alignment zone 12 includes an alignment curve (AC) 121 for stably aligning the lens 1 on the eyeball 2, and a peripheral curve (PC) 122 disposed on an outer side of the alignment curve 121.

The eccentricity of the base curve 111 of the treatment zone 11 of the lens 1 is not zero, and when the eccentricity is in range of 0 to 1, the surface of the base curve 111 can be in an elliptic shape.

Figure 3:
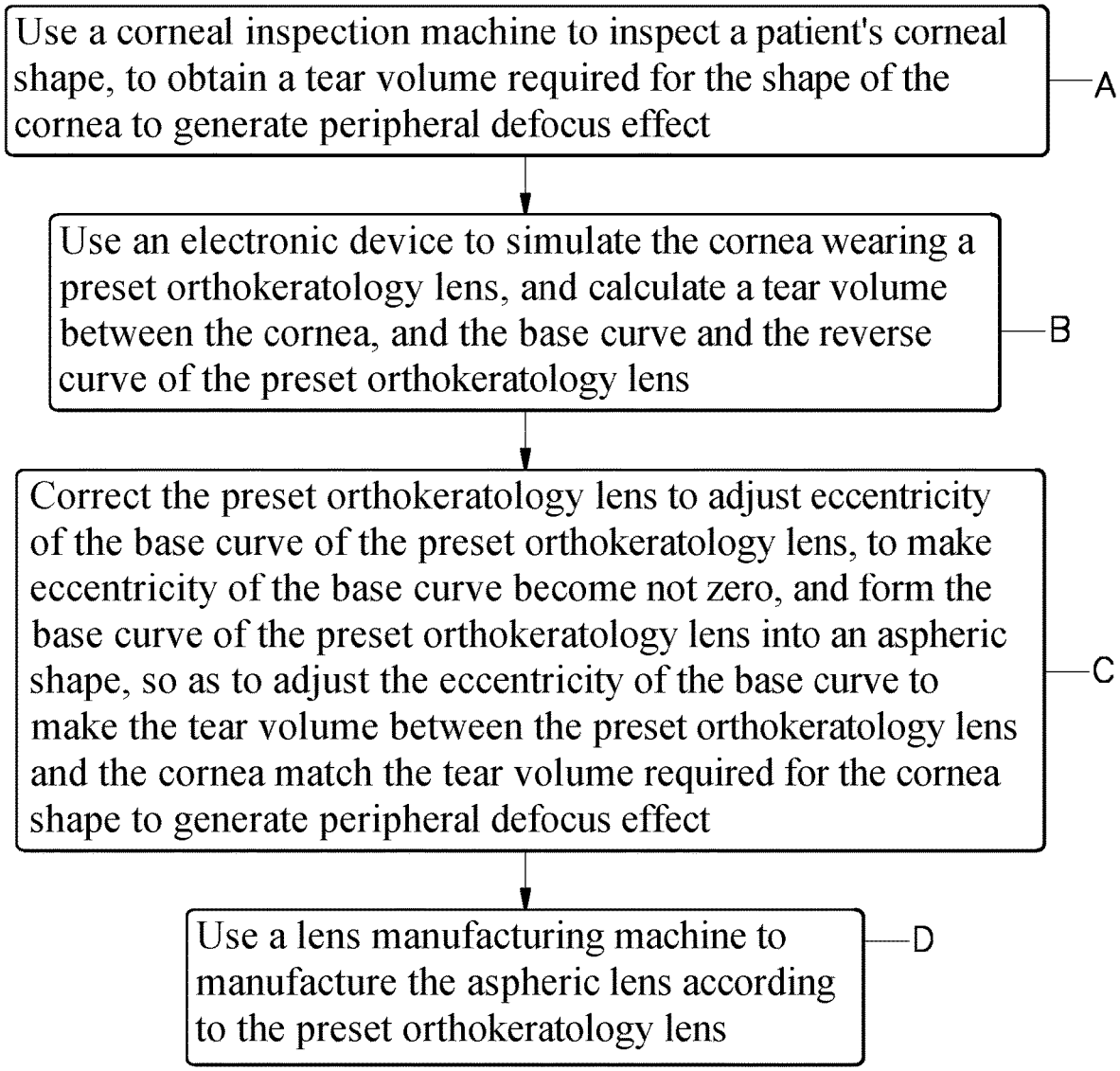
FIG. 3 is a flowchart of a method of manufacturing an aspheric lens of the present invention.

Please refer to FIG. 3, which is a flowchart of a method of manufacturing an aspheric lens of the present invention. As shown in FIG. 3, a process of manufacturing the lens 1 of the present invention can include following steps (A) to (D).

In a step (A), a corneal inspection machine, which is not shown in figures, is used to inspect a shape of a cornea 22 of a wearer's eyeball 2, so as to obtain the tear volume required for the shape of the cornea 22 to generate peripheral defocus effect.

In a step (B), the electronic device, which is not shown in figures, is used to simulate the cornea 22 wearing a preset orthokeratology lens, which is not shown in figures, and then calculate the tear volume between the cornea 22, and the base curve and the reverse curve of the preset orthokeratology lens.

In a step (C), the preset orthokeratology lens is corrected to adjust the eccentricity (E-value) of the base curve of the preset orthokeratology lens, to make the eccentricity of the base curve become not zero, thereby forming the base curve of the preset orthokeratology lens into an aspheric shape. As a result, the eccentricity of the base curve can be adjusted to make the tear volume between the preset orthokeratology lens and the cornea 22 match the tear volume required for the shape of the cornea 22 to generate peripheral defocus effect.

In a step (D), a lens manufacturing machine, which is not shown in figures, can be used to manufacture the lens 1 of the present invention according to the preset orthokeratology lens.

The corneal inspection machine used in the step (A) can include Manifest refraction, Schirmer, Axial Length, Topography, Auto-K, Corneal diameter, or a machine capable of inspecting parameters, such as diopter, shape or curvature radius of the cornea 22 of the eyeball 2.

In the step (A), the tear volume required for generating peripheral defocus effect can be obtained by performing wearing experiments in which multiple testers having corneas 22 with different shapes wear test orthokeratology lenses to collect data of tear volumes required for generating peripheral defocus effect and a database is built to store the data of the tear volumes required for the corneas 22 of various shapes to generate peripheral defocus effect.

Furthermore, the electronic device used in the step (B) can be an electronic device having calculation function, such as a desktop computer, a notebook computer or a tablet computer, and the electronic device can be installed with software of manufacturing the preset orthokeratology lens to simulate the cornea 22 wearing the preset orthokeratology lens, and use an algorithm to calculate the tear volume between the cornea 22 and the base curve and the reverse curve of the preset orthokeratology lens, and the algorithm can be expressed by following equation:

$$\text{Tear volume} = \int_0^{BCW/2} f1(x)dx + \int_{BCW/2}^{(BCW+RCW)/2} f2(x)dx$$

wherein BCW is a width of the base curve of the preset orthokeratology lens, RCW is a width of the reverse curve of the preset orthokeratology lens, f1(x) expresses an inner surface of the base curve of the preset orthokeratology lens, and f2(x) expresses an inner surface of the reverse curve of the preset orthokeratology lens.

When a user wants to correct myopia or hyperopia (that is, the image distance of the user's eyeball 2 is too long or too short), the user can wear the lens 1 on the eyeball 2 to pass light through the treatment zone 11 of the lens 1, and when light passes the base curve 111 of the treatment zone 11, an image shell 20 formed on the retina 21 can be in a non-circular shape because of non-zero eccentricity of the base curve 111. Compared with the circular-shaped image shell, the non-circular-shaped image shell 20 can increase a peripheral defocus area formed on the retina 21, and the increasing of the peripheral defocus area can cause a better myopia or hyperopia control effect compared with the conventional lens having the spherical base curve.

Furthermore, for the user wanting to correct myopia, the eccentricity of the base curve 111 of the treatment zone 11 can be set in a range of 0 to 1, so that when light passes through the base curve 111, the eccentricity of image shell 20 on the retina 21 can be in range of 0 to 1 and the image shell 20 indicates a non-circular shape, such as an elliptical shape. Compared with the preset spherical image shell "A" (shown in FIG. 1), the non-circular-shaped image shell 20 can increase the peripheral defocus area formed on a peripheral image blurring area 211 of the retina 21, thereby achieving better myopia control effect.

The aspheric lens and the manufacturing method of the present invention can have following advantages.

First, when the lens 1 is worn on the eyeball 2, the image shell 20 formed on the retina 21 can have non-zero eccentricity because of the non-zero eccentricity of the base curve 111 of the treatment zone 11, so as to increase the peripheral defocus area formed on the retina 21 and effectively control a variation rate of an eye axis becoming longer or shorter, thereby effectively controlling myopia or hyperopia, and achieving the effect of correcting myopia or hyperopia.

Secondly, the surface of the lens 1 is manufactured in a form of aspheric shape, so in a case of low myope between −0.50 D to −4.00 D, a larger space can be formed to trap tear on sections of the base curve 111 and the reverse curve 112 compared with the conventional spherical orthokeratology lens to create a larger peripheral defocus area, thereby achieving better myopia or hyperopia control effect.

Thirdly, in the process of manufacturing the lens 1, the shape of the cornea 22 is inspected first, and the eccentricity of the base curve of the preset orthokeratology lens is adjusted to form the base curve into an aspheric shape, so as to make the tear volume sandwiched between the preset orthokeratology lens and the cornea 22 match the tear volume required for the shape of the cornea 22 to generate peripheral defocus effect; as a result, the manufacturing method of the present invention can effectively make the tear volume between the lens 1 and the cornea 22 indeed match the required tear volume, thereby reducing the manufacturing deviation and improving product yield.

The above-mentioned embodiments are merely examples for illustration, and the claim scope of the present invention is not limited thereto. The main inventive concept of the present invention is that the treatment zone 11 of the lens 1 includes the base curve 111 having non-zero eccentricity, the image shell 20 formed on the retina 21 can have a non-zero eccentricity, so as to increase the peripheral defocus area formed on the retina 21, thereby effectively controlling myopia or hyperopia, and achieving the effect of correcting myopia or hyperopia. It should be noted that various equivalent structural changes, alternations or modifications based on the descriptions and figures of present invention are all consequently viewed as being embraced by the spirit and the scope of the present invention set forth in the claims.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A method of manufacturing an aspheric lens using E-value to control an eyeball growth rate, comprising:
   (A): using a corneal inspection machine to inspect a patient's corneal shape, to obtain a tear volume required for the shape of the cornea to generate peripheral defocus effect;
   (B): using an electronic device to simulate the cornea wearing a preset orthokeratology lens, and calculate a tear volume between the cornea, and the base curve and the reverse curve of the preset orthokeratology lens;
   (C): correcting the preset orthokeratology lens to adjust eccentricity of a base curve of the preset orthokeratology lens to make eccentricity of the base curve become not zero, and form the base curve of the preset orthokeratology lens into an aspheric shape, so as to adjust the eccentricity of the base curve to make the tear volume between the preset orthokeratology lens and the cornea match the tear volume required for the cornea shape to generate peripheral defocus effect; and
   (D): using a lens manufacturing machine to manufacture the aspheric lens according to the preset orthokeratology lens,
   wherein the electronic device uses an algorithm to calculate the tear volume between the cornea, and the base curve and the reverse curve of the preset orthokeratology lens, and the algorithm is expressed as:

$$\text{Tear volume} = \int_0^{BCW/2} f1(x)dx + \int_{BCW/2}^{(BCW+RCW)/2} f2(x)dx$$

wherein BCW is a width of the base curve of the preset orthokeratology lens, RCW is a width of the reverse curve of the preset orthokeratology lens, $f1(x)$ expresses a surface of the base curve of the preset orthokeratology lens, and $f2(x)$ expresses a surface of the reverse curve of the preset orthokeratology lens.

* * * * *